(12) United States Patent
Mazzitelli et al.

(10) Patent No.: US 11,133,994 B2
(45) Date of Patent: *Sep. 28, 2021

(54) DYNAMICALLY VISUALIZING MICROSERVICES MESH TOPOLOGIES

(71) Applicant: Red Hat, Inc., Raleigh, NC (US)

(72) Inventors: John Mazzitelli, Trenton, NJ (US); Jay Shaughnessy, Trenton, NJ (US)

(73) Assignee: Red Hat, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/890,388

(22) Filed: Jun. 2, 2020

(65) Prior Publication Data

US 2020/0296017 A1  Sep. 17, 2020

Related U.S. Application Data

(63) Continuation of application No. 16/257,482, filed on Jan. 25, 2019, now Pat. No. 10,680,918.

(51) Int. Cl.
*H04L 12/26* (2006.01)
*G06F 9/451* (2018.01)
(Continued)

(52) U.S. Cl.
CPC ............ *H04L 43/045* (2013.01); *G06F 9/451* (2018.02); *G06F 9/547* (2013.01); *H04L 41/22* (2013.01); *H04L 67/16* (2013.01)

(58) Field of Classification Search
CPC . G06F 9/451; G06F 9/547; G06F 9/50; H04L 41/22; H04L 67/16; H04L 43/045;
(Continued)

(56) References Cited

U.S. PATENT DOCUMENTS 8,669,982 B2  3/2014 Breeds et al.
9,716,632 B2  7/2017 Novak et al.
(Continued)

OTHER PUBLICATIONS

Ward, Chris, "Dzone's Guide to Microservices: Breaking Down the Monolithx", http://enos.itcollege.ee/~jpoial/allalaadimised/reading/microservicesguide-2017.pdf, 2017, 49 pages.
(Continued)

*Primary Examiner* — Abdullahi E Salad
(74) *Attorney, Agent, or Firm* — Lowenstein Sandler LLP (57) ABSTRACT

Implementations for dynamically visualizing microservice mesh topologies are described. An example method may include receiving a first request for a first type of visualization of a microservice mesh comprising nodes, obtaining first information regarding the nodes of the microservice mesh corresponding to the first type of visualization, providing, in a graphical user interface (GUI), the first type of visualization of the microservice mesh using the first information, receiving a second request for a second type of visualization of the microservice mesh, obtaining second information regarding the nodes of the microservice mesh corresponding to the second type of visualization, the second type of visualization different form the first type of visualization, and providing, via an update to the GUI, the second type of visualization of the microservice mesh using the second information.

20 Claims, 10 Drawing Sheets

(51) Int. Cl.
  *H04L 29/08* (2006.01)
  *H04L 12/24* (2006.01)
  *G06F 9/54* (2006.01)

(58) Field of Classification Search
  CPC .. H04L 67/10; H04L 41/0803; H04L 41/5058
  See application file for complete search history.

(56) References Cited

U.S. PATENT DOCUMENTS

| | | | | |
|---|---|---|---|---|
| 10,614,071 | B1* | 4/2020 | Chen | G06F 9/455 |
| 2016/0127978 | A1* | 5/2016 | Jing | H04L 41/22 |
| | | | | 370/254 |
| 2016/0182308 | A1* | 6/2016 | Bill | H04L 41/085 |
| | | | | 370/254 |
| 2017/0168664 | A1* | 6/2017 | Kashyap | G06T 11/206 |
| 2018/0088925 | A1* | 3/2018 | Emeis | G06T 11/206 |
| 2018/0157928 | A1 | 6/2018 | Oliveira et al. | |
| 2018/0210929 | A1* | 7/2018 | Mukherjee | G06F 16/248 |
| 2018/0287876 | A1 | 10/2018 | Strobel et al. | |
| 2018/0316568 | A1* | 11/2018 | Gill | H04L 43/04 |
| 2019/0121801 | A1* | 4/2019 | Jethwa | G06F 16/3334 |
| 2019/0215248 | A1* | 7/2019 | D'Ippolito | H04L 41/5051 |
| 2020/0162380 | A1* | 5/2020 | Pilkington | H04L 45/306 |

OTHER PUBLICATIONS

Rupp, Heiko, "Observe What Your Istio Microservices Mesh is doing with Kiali", https://developers.redhat.com/blog/2018/09/20/istio-mesh-visibility-with-kiali/, Sep. 20, 2018, 9 pages.

Ma, Shang-Pin, "Using Service Dependency Graph to Analyze and Test Microservices", https://ieeexplore.ieee.org/document/8377834, Jul. 23, 2018.

Mazzitelli, John, "Different Mesh Visualizations in Kiali", https://medium.com/kialiproject/different-mesh-visualizations-in-kiali-82a3428ae155, Sep. 14, 2018, 10 pages.

USPTO, Notice of Allowance for U.S. Appl. No. 16/257,482, dated Feb. 7, 2020.

* cited by examiner

DYNAMICALLY VISUALIZING MICROSERVICES MESH TOPOLOGIES

RELATED APPLICATIONS

This application is a continuation of U.S. patent application Ser. No. 16/257,482 filed on Jan. 25, 2019, the entire content of which is incorporated by reference herein.

TECHNICAL FIELD

The disclosure is generally related to microservices in computer systems, and more particularly, to dynamically visualizing microservices mesh topologies.

BACKGROUND

Microservices are processes, such as pieces of software instruction code, which compute responses for client requests. For example, a client sends a request and a microservice responds to that request. Microservices may be deployed in a "microservices mesh" or "service mesh" in a clustering technology. Utilization of microservices allows for the breaking down of complex applications into relatively simple independent processes. As a result, highly-decoupled systems may be produced. Each system may include multiple applications that are hosted on a provider's infrastructure. The microservices may be executed in containers to create containerized applications. Containerization is an operating-system (OS)-level virtualization environment of a host machine that provides a way to isolate the microservice process. Each microservice process is focused on doing a relatively simple task to support the application for each individual container.

BRIEF DESCRIPTION OF THE DRAWINGS

The disclosure is illustrated by way of examples, and not by way of limitation, and may be more fully understood with references to the following detailed description when considered in connection with the figures, in which.

DETAILED DESCRIPTION

Described herein is a system for dynamically visualizing microservices mesh topologies. A microservices mesh topology is a representation of the interrelations and/or arrangement of components of a microservices mesh. A microservices mesh (also referred to as a microservice mesh or service mesh) is a collection of microservices, which are processes (such as pieces of software instruction code) that compute responses for client requests. For example, a client sends a request and a microservice responds to that request. The client can be a microservice. Microservices may be deployed in a microservices mesh in a clustering technology.

Utilization of microservices allows for the breaking down of complex applications into relatively simple independent processes. As a result, highly-decoupled systems may be produced. A containerized computing services platform, such as a platform-as-a-service (PaaS) system, may implement microservices. The microservices may be executed in containers to create containerized applications in the containerized computing services platform. Containerization is an operating-system (OS)-level virtualization environment of a host machine that provides a way to isolate the microservice process. Each microservice process is focused on doing a relatively simple task to support the application for each individual container.

A microservices mesh may include a number of different components. A first component is a workload. A workload can be, for example, a pod of a cluster of the containerized computing services platform. A pod may refer to a group of one or more containers that are deployed together on the same node. Workloads perform the work within a microservices mesh. For example, a workload may process HyperText Transport Protocol (HTTP) requests and return HTTP responses.

A second component is a service. A service is a named endpoint that requests are sent to. A service does not perform any work, but instead requests sent to a service are routed to a workload to perform the actual work to process the service's request. A service can route to more than one workload, and a workload can process requests for one or more services.

A final component is an application ("app"). An app is made up of workloads that have an "app" label applied to them (the app name is the value of the app label). Apps can be versioned by another label called "version". If a workload has a label of "app=details" with another label "version=v1", then this workload is a "Versioned app" whose name is "details v1". However, in implementations of the disclosure, the app label does not have to be called "app" and the version label does not have to be called "version". Instead, the labels' values should correspond to the app and version. For example, the app label could be called "kubernetes.io/application" and the version label could be called "kubernetes.io/ver". The relevant inquiry is that the label values correspond to "app" and "version". The implementation can be informed what the name of the labels are that it should be using. For example, the implementation can be configured to proceed as follows: "For the app label", look for a label called "fooapp", and for the version label look for a label called "fooversion".

Due to the various components and intricate connections between these components in a microservices mesh, visualizing a graph to represent the topology of the microservices mesh is not a trivial task. For example, generating a graph visualizing the service-to-service links in a microservices mesh is not straightforward, as the connections between services in a microservices mesh is not directly captured or represented in data or metadata identifying the microservices mesh configuration.

Conventional systems implement static visualizations of microservices meshes. These static visualizations provide a single view of the microservices mesh with a fixed set of nodes and connections visualized. Furthermore, these conventional systems do not allow visualization of the full set of components of the microservices mesh. The conventional systems visualize workload nodes and did not allow for any other type of nodes (e.g., app nodes or service nodes) in the microservices mesh to be visualized. Furthermore, the conventional systems rely upon labels of the workload nodes to generate the static visualization. As such, if a microservices mesh does not implement labels, the visualization fails. As a result of the above deficiencies, the conventional systems are not flexible in the visualization options they provide, often resulting in graph complexity that can introduce difficulty in visualizing and monitoring a microservices mesh or resulting in a failure of the visualization altogether.

Aspects of the disclosure address the above and other deficiencies by providing technology that dynamically visualizes microservices mesh topologies using multiple graph types that are selected based on user input. A mesh visualization component of a containerized computing service platform may provide multiple various visualizations (e.g., microservices mesh graph types) of a microservices mesh implemented by a containerized computing services platform. The microservices mesh graph types capable of generation by the mesh visualization component include, but are not limited to, a workload graph, a versioned app graph, an app graph, and a service graph, which are described in more detail herein. These multiple visualizations may be based on the metadata and configuration data of the microservices of the service mesh. The mesh visualization component may utilize microservices mesh metadata and configuration data to generate the several different microservices mesh graph types that represent the microservices mesh implemented by the containerized computing services platform. The microservices mesh graph types enable the microservices mesh to be visualized for a user in as much as or little detail as the user prefers.

In one implementation, the mesh visualization component may receive a user request for a particular type of microservices mesh graph type (e.g., workload graph, versioned app graph, app graph, services graph) for a microservices mesh. Based on the requested microservices mesh graph type, the mesh visualization component may access a microservices mesh data store to identify nodes of the microservices mesh and the connections between such nodes in order to generate the requested microservices mesh graph type for the microservices mesh. The requested microservices mesh graph type is provided for visualization via a graphical user interface (GUI), which may be presented at a client device that originated the request for the visualization. The visualization provided via the GUI may be dynamically updated to display a different microservices mesh graph type upon a user request. Furthermore, the visualization may be presented with real-time performance data and other visualization cues reflecting a status of the microservices mesh. For example, performance data such as request rate, response time, and percentage distribution of requests may be identified and provided on the visualization to provide a user with status and monitoring capabilities for the microservices mesh.

As such, the systems and methods described herein include technology that enhances dynamical visualization of microservices mesh topologies for a computer system. In particular, aspects of the disclosure provide technology that enhances the efficiency and/or performance of visualization of microservices meshes in a containerized computing service platform. The technology enables the visualization of the microservices mesh in various different views. This may enhance the efficiency and performance of the computer system by improving monitoring and debugging capabilities for a microservices mesh. This may also help increase efficiency of the microservices mesh as the various different views enable a more precise and accurate view of the components of the microservices mesh and the interconnections between such components, allowing for more efficient configuration of the microservices mesh. This may decrease both the processor cycles and input/output (I/O) overhead required to implement a microservices mesh in a containerized computing services platform. The performance enhancements may enable a computing system to reduce the amount of computing resources consumed by a containerized computing services platform and enable the computing system to support a more robust and higher-performing microservices mesh.

Various aspects of the above referenced methods and systems are described in details herein below by way of examples, rather than by way of limitation.

Figure 1:
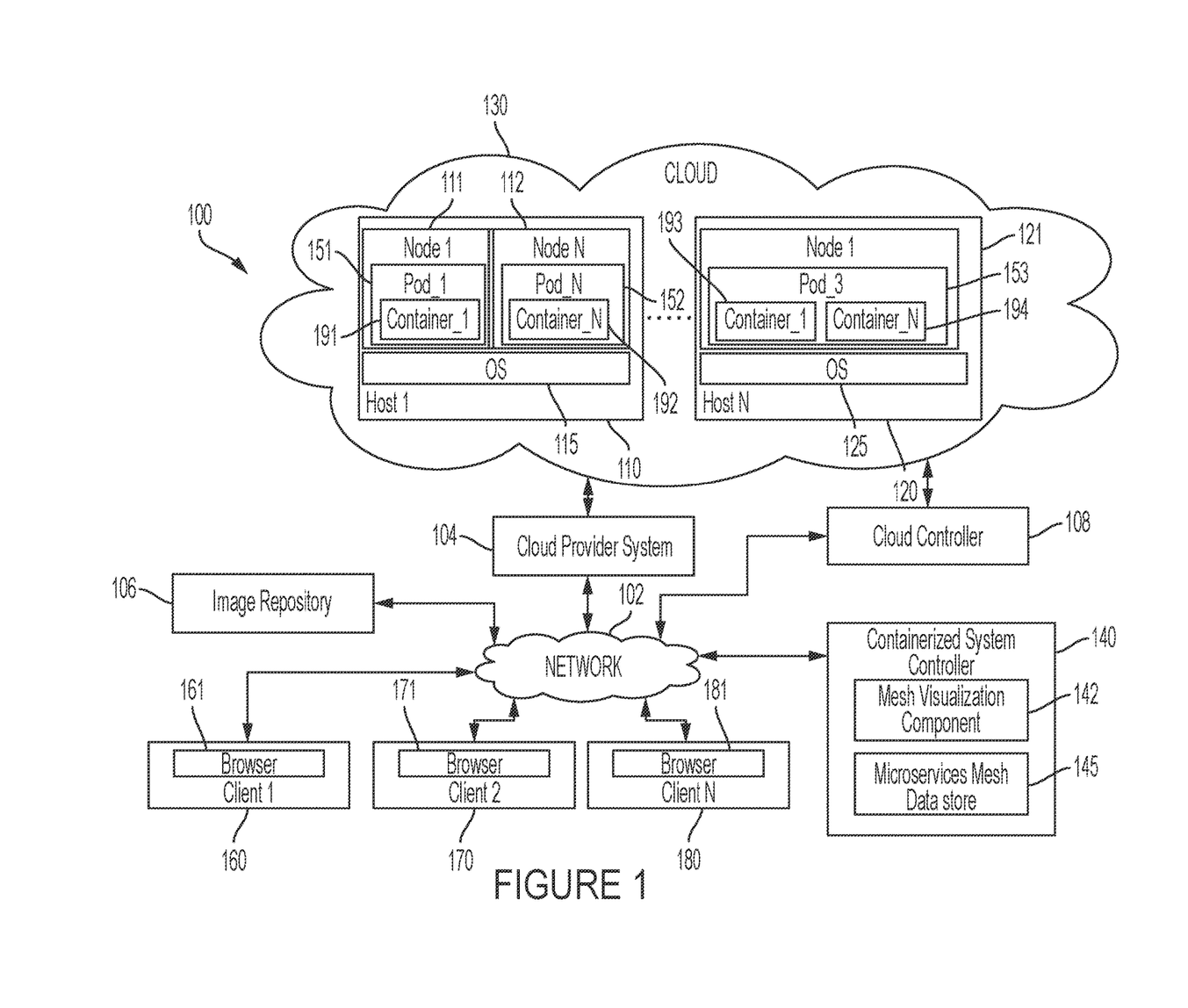
FIG. 1 depicts a high-level block diagram of an example computer system architecture, in accordance with one or more aspects of the disclosure.

FIG. 1 is a block diagram of a network architecture 100 in which implementations of the disclosure may operate. In some implementations, the network architecture 100 may be used in a containerized computing services platform. A containerized computing services platform may include a Platform-as-a-Service (PaaS) system, such as OpenShift®. The PaaS system provides resources and services (e.g., micro-services) for the development and execution of applications owned or managed by multiple users. A PaaS system provides a platform and environment that allow users to build applications and services in a clustered compute environment (the "cloud") Although implementations of the disclosure are described in accordance with a certain type of system, this should not be considered as limiting the scope or usefulness of the features of the disclosure. For example, the features and techniques described herein can be used with other types of multi-tenant systems and/or containerized computing services platforms.

As shown in FIG. 1, the network architecture 100 includes a cloud-computing environment 130 (also referred to herein as a cloud) that includes nodes 111, 112, 121 to execute applications and/or processes associated with the applications. A "node" providing computing functionality may provide the execution environment for an application of the PaaS system. In some implementations, the "node" may refer to a virtual machine (VM) that is hosted on a physical machine, such as host 1 110 through host N 120, implemented as part of the cloud 130. In some implementations, the host machines 110, 120 are often located in a data center. For example, nodes 111 and 112 are hosted on physical machine of host 1 110 in cloud 130 provided by cloud provider 104. In some implementations, an environment other than a VM may be used to execute functionality of the PaaS applications. When nodes 111, 112, 121 are implemented as VMs, they may be executed by operating systems (OSs) 115, 125 on each host machine 110, 120.

In some implementations, the host machines 110, 120 are often located in a data center. Users can interact with applications executing on the cloud-based nodes 111, 112, 121 using client computer systems, such as clients 160, 170 and 180, via corresponding web browser applications 161, 171 and 181. In other implementations, the applications may be hosted directly on hosts 1 through N 110, 120 without the use of VMs (e.g., a "bare metal" implementation), and in such an implementation, the hosts themselves are referred to as "nodes".

Clients 160, 170, and 180 are connected to hosts 110, 120 in cloud 130 and the cloud provider system 104 via a network 102, which may be a private network (e.g., a local area network (LAN), a wide area network (WAN), intranet, or other similar private networks) or a public network (e.g., the Internet). Each client 160, 170, 180 may be a mobile device, a PDA, a laptop, a desktop computer, a tablet computing device, a server device, or any other computing device. Each host 110, 120 may be a server computer system, a desktop computer or any other computing device. The cloud provider system 104 may include one or more machines such as server computers, desktop computers, etc.

In one implementation, the cloud provider system 104 is coupled to a cloud controller 108 via the network 102. The cloud controller 108 may reside on one or more machines (e.g., server computers, desktop computers, etc.) and may manage the execution of applications in the cloud 130. In some implementations, cloud controller 108 receives commands from containerized system controller 140. In view of these commands, the cloud controller 108 provides data (e.g., such as pre-generated images) associated with different applications to the cloud provider system 104. In some implementations, the data may be provided to the cloud provider 104 and stored in an image repository 106, in an image repository (not shown) located on each host 110, 120, or in an image repository (not shown) located on each node 111, 112, 121. This data may be used for the execution of applications for a containerized computing services platform managed by the containerized system controller 140.

In one implementation, the data is used for execution of containers 191, 192, 193, 194 in one or more pods 151, 152, 153. The pods 151, 152, 153 area group of one or more containers that are deployed together on the same node 111, 112, 121, and are the smallest compute unit that can be defined, deployed, and managed in the containerized computing service environment. Each pod 151, 152, 153 is allocated its own internal IP address, with containers 191, 192, 193, 194 within pods 151, 152, 153 being able to share local storage and networking. Pods 151, 152, 153 have a lifecycle that is defined and can run on a node 111, 112, 121 until the pod's containers exit or they are removed for some other reason.

The containers 191, 192, 193, 194 can include application images built from pre-existing application components and source code of users managing the application. An image may refer to data representing executables and files of the application used to deploy functionality for a runtime instance of the application. In one implementation, the image can be built using a Docker™ tool and is referred to as a Docker image. In other implementations, the application images can be built using other types of containerization technologies. A container 191, 192, 193, 194 is a secure process space on the nodes 111, 112, 121 to execute functionality of an application. In some implementations, a container 191, 192, 193, 194 is established at the nodes 111, 112, 121 and 122 with access to certain resources of the underlying node, including memory and storage. In one implementation, the containers 191, 192, 193, 194 may be established using the Linux Containers (LXC) method. In further implementations, containers 191, 192, 193, 194 may also be established using cgroups, SELinux™, and kernel namespaces, to name a few examples.

In some implementations, the containerized system controller 140 may implement a mesh virtualization component 142. The mesh visualization component 142 may provide visualizations of a microservices mesh implemented by containerized system controller 140 via nodes 111, 112, 121. For example, nodes 111, 112, 121 may be utilized to implement a service mesh that deploys microservices via pods 151, 152, 153. Pods 151, 152, 153 can provide the workload of the microservices of the microservices mesh, as discussed herein. The mesh visualization component 142 may provide the visualizations of the microservices mesh to one or more requesting users at client devices 160, 170, 180. For example, in response to a request for a particular microservices mesh graph type, mesh visualization component 142 may transmit generated visualization data for the requested microservices mesh graph type to client device 160, 170, 180 to be rendered via a GUI for display to the requesting user using, for example, browser 161, 171, 181 at client device 160, 170, 180.

As discussed above, a microservices mesh can include components such as workloads, apps, and services. The components of the service mesh can be represented in a graph of directed nodes with nodes in the graph representing the microservices of the microservices mesh. Such a graph may be referred to herein as a microservices mesh graph or a graph. A microservices mesh graph may represent each workload, app, and service as a node in the microservices mesh graph. Nodes in the microservices mesh graph may be connected to one another based on which nodes are communicating with one another. For example, if node A sends a request to node B, the microservices mesh graph depicts the two nodes A and B connected via an edge.

Mesh visualization component 142 may provide the various visualization of the microservices mesh based on the metadata of the microservices of the microservices mesh. The metadata may be stored in a microservices mesh data store 145 maintained by containerized system controller 140. Although microservices mesh data store 145 is illustrated as part of containerized system controller 140, data store 145 may be maintained separately from containerized system controller 140.

Mesh visualization component 142 may utilize microservices mesh data 145 to generate several different microservices mesh graph types that represent the microservices mesh implemented by containerized system controller 140. The microservices mesh graph types enable the microservices mesh to be visualized for a user in as much as or little detail as the user prefers. The microservices mesh graph types capable of generation by mesh visualization component 142 include, but are not limited to, a workload graph, a versioned app graph, an app graph, and a service graph.

In one implementation, mesh visualization component 142 may receive a user request for a particular type of microservices mesh graph type for a microservices mesh. Based on the requested microservices mesh graph type, mesh visualization component 142 may access microservices mesh data store 145 to identify the microservices mesh nodes and the connections between such nodes in order to generate the requested microservices mesh graph type for the microservices mesh.

FIGS. 2A through 2E are example depictions of various microservices mesh graph types generated by mesh visualization component 142, in accordance with implementations of the disclosure. The various microservices mesh graph types shown in FIGS. 2A-2E may be provided to a user device for display via a GUI. For purposes of illustration and ease of explanation, FIGS. 2A-2E illustrate microservices mesh graph types for an example application that displays information about a book, similar to a single catalog entry of an online book store. The application is capable of displaying a page (e.g., web page) having a description of the book, book details (ISBN, number of pages, title, etc.), and book reviews. The example application is broken into four separate microservices: productpage, details, reviews, and ratings.

In FIGS. 2A-2E, workloads are denoted with the "circle" nodes, services are denoted with "triangle" nodes, apps are denoted with "square" nodes, and the "diamond" nodes represent a source of traffic (e.g., a user request such as a browser making direct requests) coming into the mesh. In some implementations, app nodes may also be referred to as application nodes. FIGS. 2A-2E and their associated illustrated microservices mesh graph types are described in further detail below.

Figure 2A:
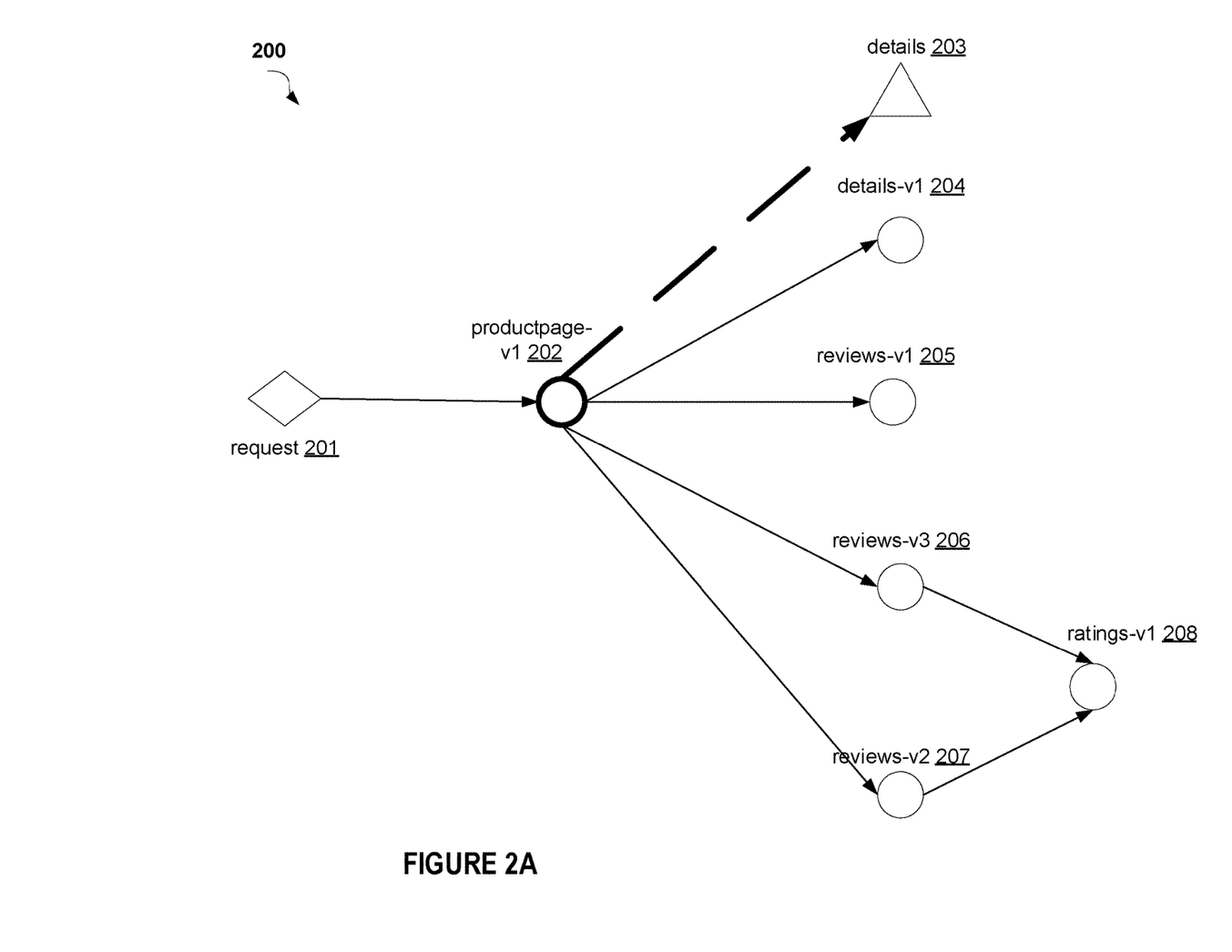
FIGS. 2A-2E depict example screenshots of visualizations of a microservices mesh according to one or more aspects of the disclosure.

FIG. 2A is an example depiction of a workload graph 200 of a microservices mesh, in accordance with an implementation of the disclosure. Workload graph 200 visualizes the microservices mesh of the example application using a workload graph type, which depicts every workload in the microservices mesh. The workload graph type ignores the metadata associated with the workloads. In other words, the workload graph type does not user the "app" or "version" labels that are associated with a workload in a microservices mesh. As a result, the mesh visualization component 142 can provide a visualization of the microservices mesh even if labels are not used on workload in the microservices mesh.

Mesh visualization component 142 may access microservices mesh data store 145 to determine which workloads communicate with one another. In one implementation, each workload in a microservices mesh is associated with a service. The service provides a description of the functionality that the workload implements. The service is itself an exposed application programming interface (API) interface of the workload. The exposed API can identify other services (and thereby workloads) to which the service communicates. By examining the exposed API interface (e.g., service) of the workload, the mesh visualization component 142 can determine which workloads are communicating with one another in order to represent such workloads as connected in the workload graph type of visualization of the microservices mesh.

As shown in FIG. 2A, workload graph 200 depicts a client device (e.g., via a browser application) that makes a direct request 201 into the "productpage-v1" workload 202. Note that the "productpage-v1" workload 202 is shown in a heavier weighted line and that the edge going from the workload 202 to the details service 203 is dashed and also weighted. This can indicate that an error is occurring in the microservices mesh at this particular connection. In some implementations, other techniques to depict an error may be utilized, such as colors, to depict the existence of and/or criticality of errors, and so on. An error-free connection is depicted from the "productpage-v1" workload 202 to the "details-v1" workload 204. The "details" service 203 and the "details-v1" 204 workload are both depicted in the workload graph 200 to show that some requests made by the "productpage-v1" workload 202 to the "details-v1" workload 204 were successful, while some requests have failed to make it to the "details-v1" workload 204. These failed requests are shown as the failed connection to the "details" service 203, as it is only known that these failed requests made it to the "details" service 203 but not the "details-v1" workload 204. Also depicted in workload graph 200 are "reviews-v1" workload 205, "reviews-v3" workload 206, and "reviews-v2" workload 207. "Reviews-v3" workload 206 and "reviews-v2" workload 207 are further shown as connected to the "ratings-v1" workload 208.

Figure 2B:
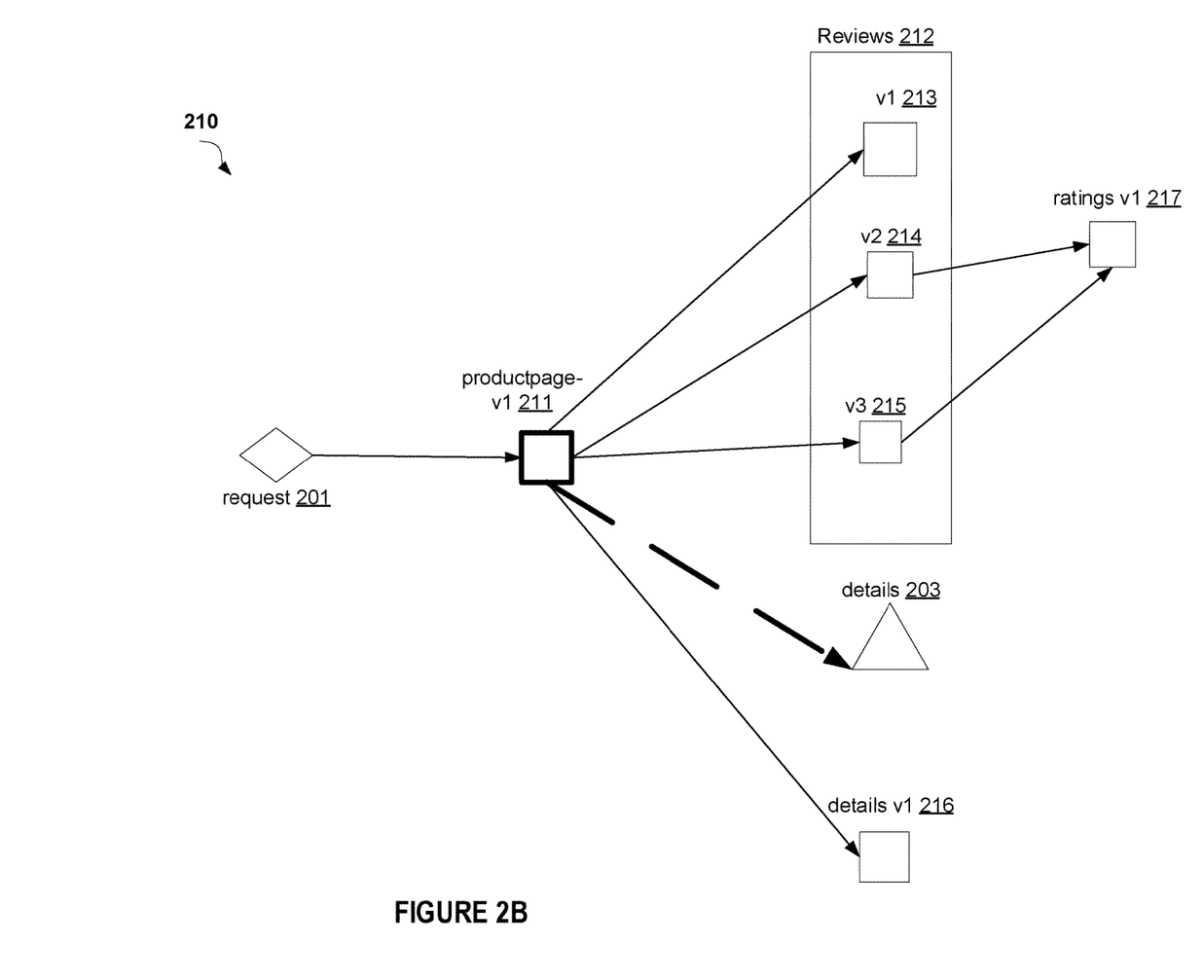

FIG. 2B is an example depiction of a versioned app graph 210 of a microservices mesh, in accordance with an implementation of the disclosure. Versioned app graph 210 visualizes the microservices mesh of the example application using a versioned app graph type. The versioned app graph type depicts every app in the microservices mesh and also groups any versioned apps in a composite "version box". The versioned app graph type utilizes the metadata associated with the workloads to group the workloads. In other words, the versioned app graph type analyzes any "app" or "version" labels that are associated with a workload in microservices mesh data store 145. These labels may be assigned to a workload when the microservice is configured by an administrator in the containerized computing service platform. The labels may be stored as metadata of a workload in microservices mesh data store 145. Mesh visualization component 142 may access microservices mesh data store 145 to determine the labels associated with each workload and, as such, visualize and contextualize the associated apps to one another.

As shown in FIG. 2B, versioned app graph 210 depicts a direct request 201 into the "productpage-v1" app 211. In some implementations, the names of the apps are not the same as the workload names, despite the similarity between FIGS. 2A and 2B. Similarity in workload and app names may occur when workloads names are configured similar to the app and version labels of the workload. "Productpage-v1" app 211 is shown as connected to the reviews app composite box 212 and the "details v1" app 216. There are three versions of the reviews app: v1 213, v2 214, and v3 215, which are grouped together in the reviews app composite box 212. "Reviews v2" app 214 and "reviews v3" app 215 may be further connected to "ratings-v1" app 217. The versioned app graph 210 can depict additional details and connections between apps, as shown in the connections between a subset of the reviews apps (i.e., v2 214 and v3 215) being connected to the "ratings-v1" app 217.

Similar to workload graph 200 of FIG. 2A, versioned app graph 210 depicts "productpage-v1" app 211 in a heavier weighted line and the edge going from the app 211 to the details service 203 is dashed and also weighted. This indicates that errors are occurring in the microservices mesh at this connection. The connection to the details service 203 is provided to illustrate where the failed requests are occurring in the microservices mesh. In some implementations, when a single version of an app is the only version of the app in the microservices mesh, the app may be depicted in the versioned app graph as version "v1" of the single app (see, e.g., "product-page v1" 211, "details-v1" 216, and "rating v1" 217).

Figure 2C:
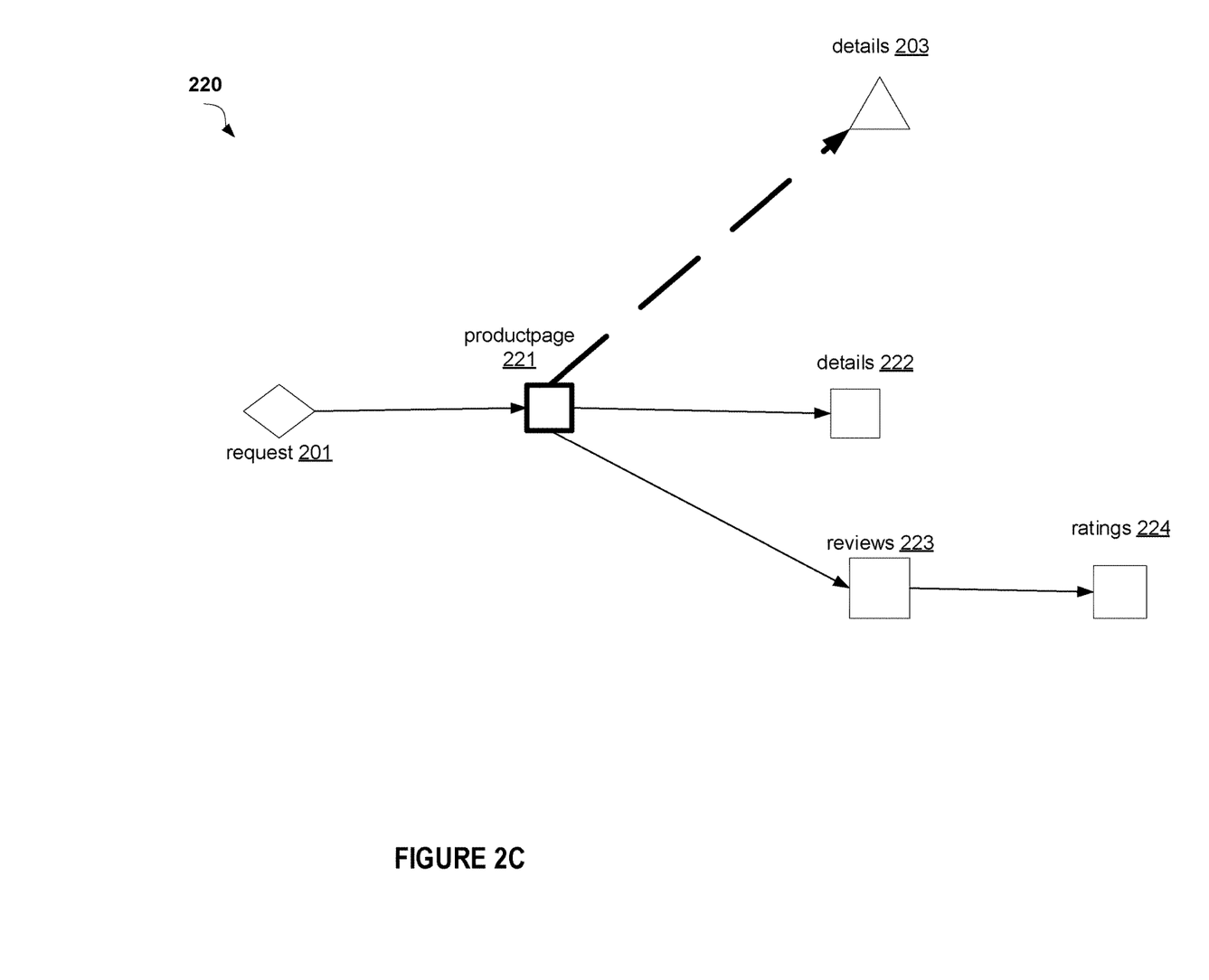

FIG. 2C is an example depiction of an app graph 220 of a microservices mesh, in accordance with an implementation of the disclosure. App graph 220 visualizes the microservices mesh of the example application using an app graph type. The app graph type depicts each app in the microservices mesh and aggregates all versioned apps into a single app node. The app graph 220 is similar to the versioned app graph 210 of FIG. 2B, except for the aggregation of all versions of an app into a single node. As with the versioned app graph 210, the app graph type 220 utilizes the metadata associated with the workloads to group the workloads. In other words, the versioned app graph type utilizes and analyzes the "app" or "version" labels that are associated with a workload in microservices mesh data store 145.

As shown in FIG. 2C app graph 200 depicts a direct request 201 being made to the "productpage" app 221. The names of the apps in the app graph do not include the version number of the app, as the versions in the app graph are aggregated into a single app node. "Productpage" app 221 is shown as connected to the "details" app 222 and the "reviews" app 223. The "reviews" app 223 is further depicted as connected to the "ratings" app 224. "Details" app 222 may correspond to "details-v1" app 216 of versioned app graph 210 of FIG. 2B. "Reviews" app 223 may correspond to the reviews app composite box 212 of versioned app graph 210 of FIG. 2B. "Ratings" app 224 may correspond to "rating-v1" app 217 of versioned app graph 210 of FIG. 2B.

Similar to workload graph 200 of FIG. 2A, app graph 220 depicts "productpage" app 221 in a heavier weighted line and the edge going from the app 221 to the details service 203 is dashed and also weighted. This indicates that errors are occurring in the service mesh at this connection. The connection to the details service 203 is provided to illustrate where the failed requests are occurring in the microservices mesh.

Figure 2D:
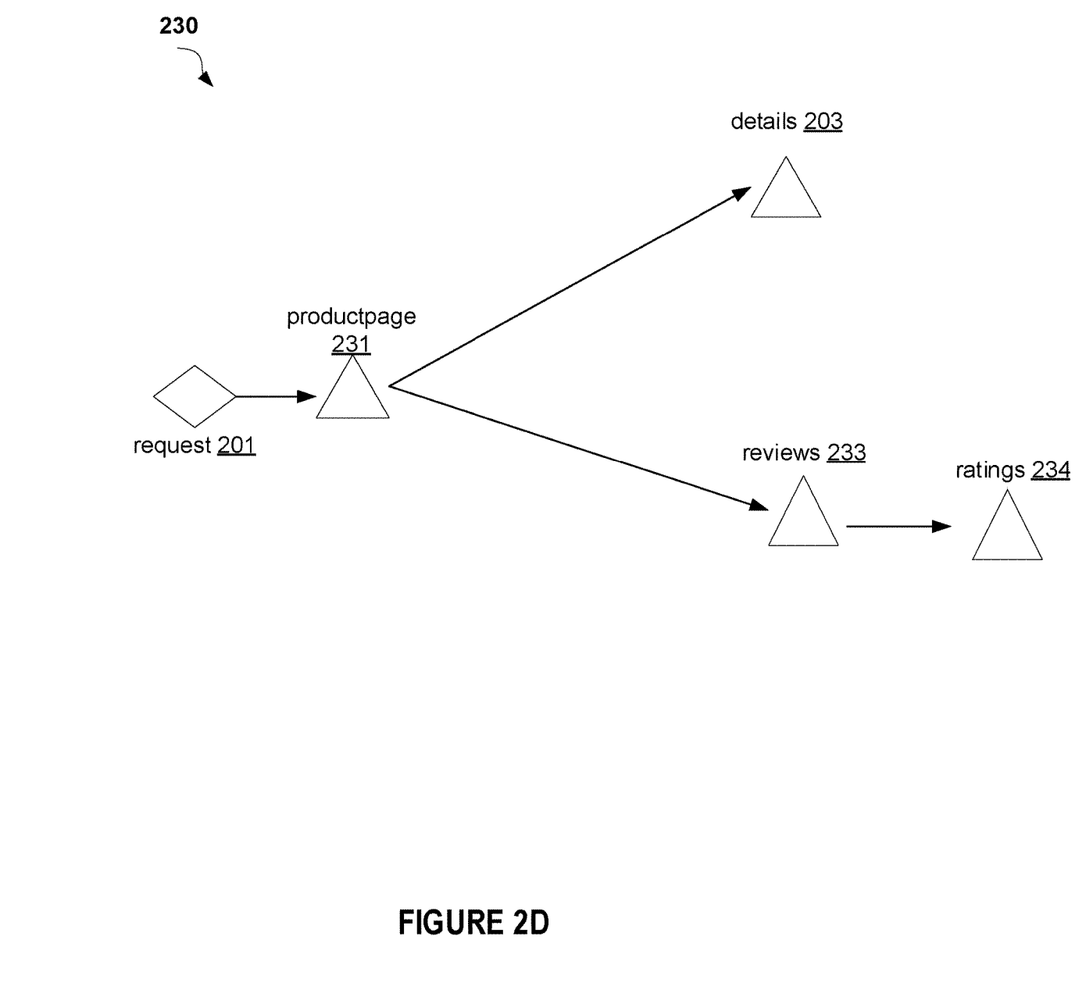

FIG. 2D is an example depiction of a service graph 230 of a microservices mesh, in accordance with an implementation of the disclosure. Service graph 230 visualizes the microservices mesh of the example application using a service graph type. The service app graph type depicts every service in the microservices mesh. The service graph 230 hides all apps and workloads of the microservices mesh and instead shows all services of the microservices mesh. The service graph 230 provides a high-level conceptual view of the microservices mesh. As with the workload graph 200 of FIG. 2A, the service graph 220 may access microservices mesh data store 145 to determine which services are connected to one another via the exposed API service interfaces of the workloads.

As shown in FIG. 2D service graph 230 depicts a direct request 201 into the "productpage" service 231. "Productpage" service 231 is shown as connected to the "details" service 203 and the "reviews" service 233. The "reviews" service 233 is further depicted as connected to the "ratings" service 234.

In some implementations, the mesh visualization component 142 provides a feature to show or hide all services for a workload as part of the generated visualization. Showing and hiding services may be a feature applied to the workload graph type, the versioned app graph type, and the app graph type. As the service graph type is already showing all services, the show and hide services feature is not applicable to this graph type. In some implementations, the show and hide service feature may also be referred to as the enable service nodes feature, inject service nodes feature, a service node display enablement feature, or a service nodes-injected feature.

Figure 2E:
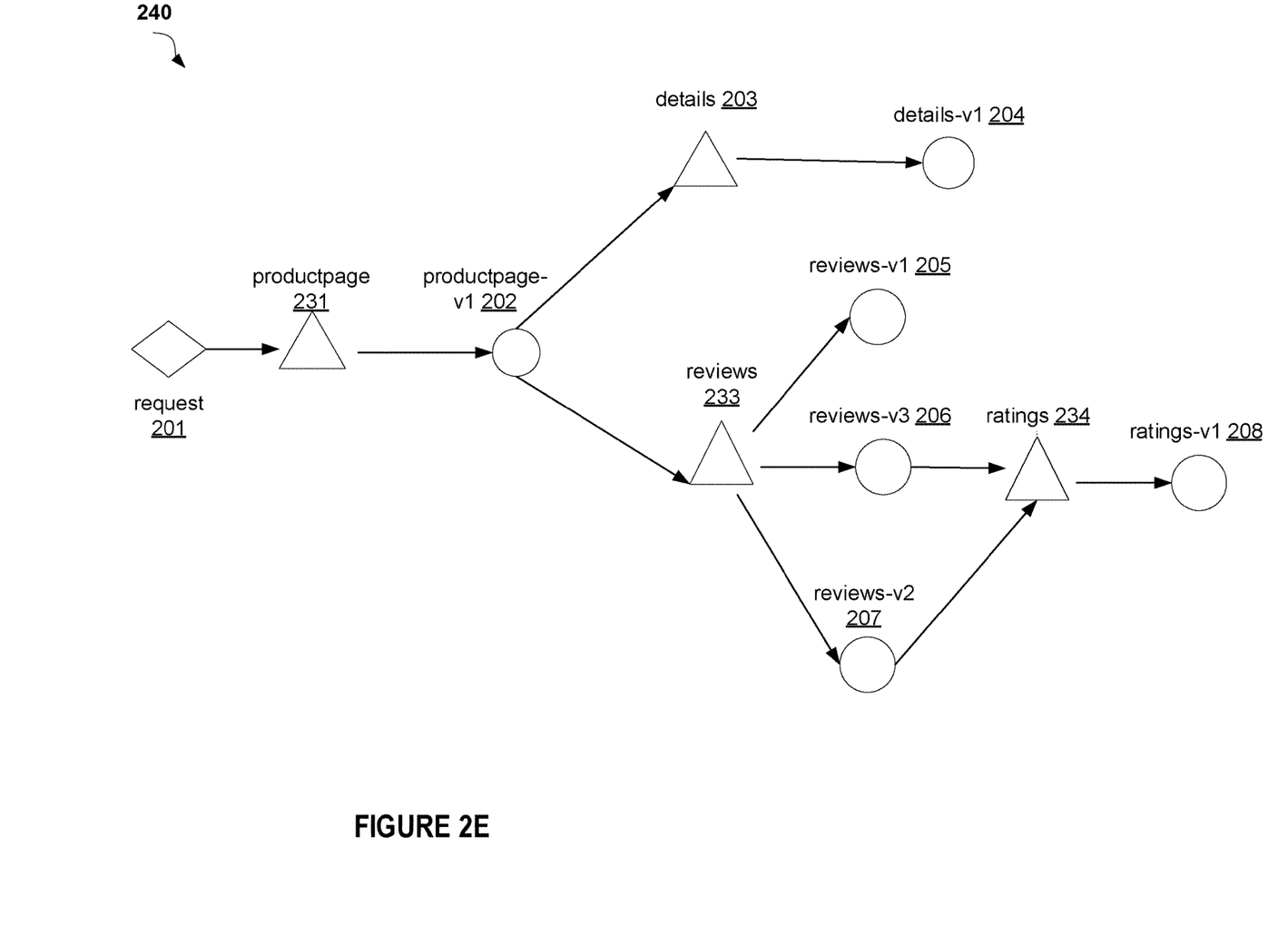

FIG. 2E is an example depiction of a service nodes-injected workload graph 240 of a microservices mesh, in accordance with an implementation of the disclosure. Service nodes-injected workload graph 240 is the same as workload graph 200 of FIG. 2A, with the show and hide service nodes feature enabled to show all service nodes. As such, each workload 202, 204, 205, 206, 207, 208 of the workload graph 200 is shown in the service nodes-injected workload graph 240 with a corresponding service 231, 203, 233, 234 in front of the respective workload.

As a workload 202, 204, 205, 206, 207, 20 can implement zero or more services, injecting service nodes into the service-nodes injected graph 240 can help illustrate to the user what workloads are servicing requests for what services. At the same time, showing service nodes in a microservices mesh graph can make the graph appear "busy" or complicated. As such, providing a feature to hide the service nodes can help make the microservices mesh graph easier to understand and make the microservices mesh graph smaller. In some implementations, the feature of showing and hiding service nodes may be provided via a toggle control (e.g., toggle switch, drop-down menu, etc.) in the UI of the microservices mesh graph visualization to allow the user ease of enabling and disabling this feature. Although the workload graph 200 is shown as an example of a service-node injected graph, the versioned app graph 210 and app graph 220 may also be visualized with service nodes injected into the graphs 210, 220.

Mesh visualization component 142 may also apply edge labels to the various microservices mesh graph types that are generated in order to depict real-time performance data corresponding to the microservices mesh. For example, mesh visualization component 142 may apply edge labels indicated real-time performance data corresponding to request rate, response time, and percentage distribution of requests, to name a few examples. This edge label data may be dynamically updated to provide an end-user with real-time feedback regarding the performance of connections in the microservices mesh. Visualization cues may also be applied to the edges to indicate status, such as color, highlighting, weighting, line effect, and so on. For example, the visualization cues may indicate whether an error is occurring on a connection as well as the status of the error (critical, high, caution, above average, etc.). In one implementation, mesh visualization component 142 may obtain the performance data for the edge labels from microservices mesh data store 145, which may be updated in real-time with such performance data.

The edge labels applied by mesh visualization component 142 may also include security information. In one implementation, the security information may indicate which edges are subject to a secure transport. For example, an edge using HTTP secure (HTTPS) protocol may be marked or otherwise indicated as being a secure connection between nodes in the microservices mesh graph visualization.

In some implementations, the edge labels applied by the mesh visualization component 142 may include badges. The badges can indicate something unique about the connection that is outside of the strict topology of the microservices mesh. For example, a badge may indicate that a virtual service or routing rule is applied to a particular connection represented by an edge. A virtual service or a routing rule may refer to a rule that dictates how request traffic should be routed to a node. For example, a virtual service/routing rule may state that 70% of traffic should be routed to a version 1 workload node while the other 30% of the traffic should be routed to a version 2 workload node.

While various implementations are described in terms of the environment described above, the facility may be implemented in a variety of other environments including a single, monolithic computer system, as well as various other combinations of computer systems or similar devices connected in various ways.

Figure 3:
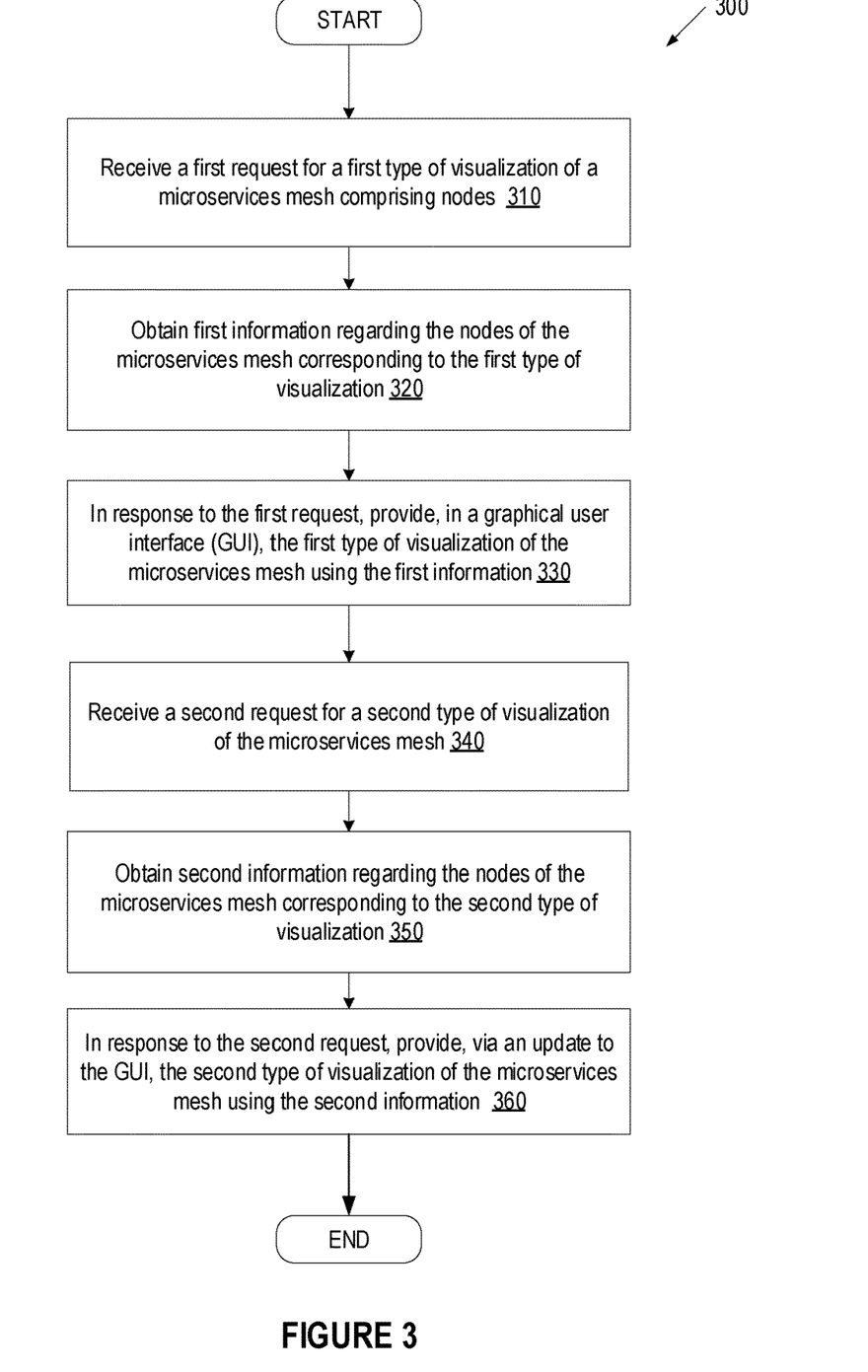
FIG. 3 depicts a flow diagram of an example method for dynamically visualizing microservices mesh topologies in accordance with one or more aspects of the disclosure.
Figure 4:
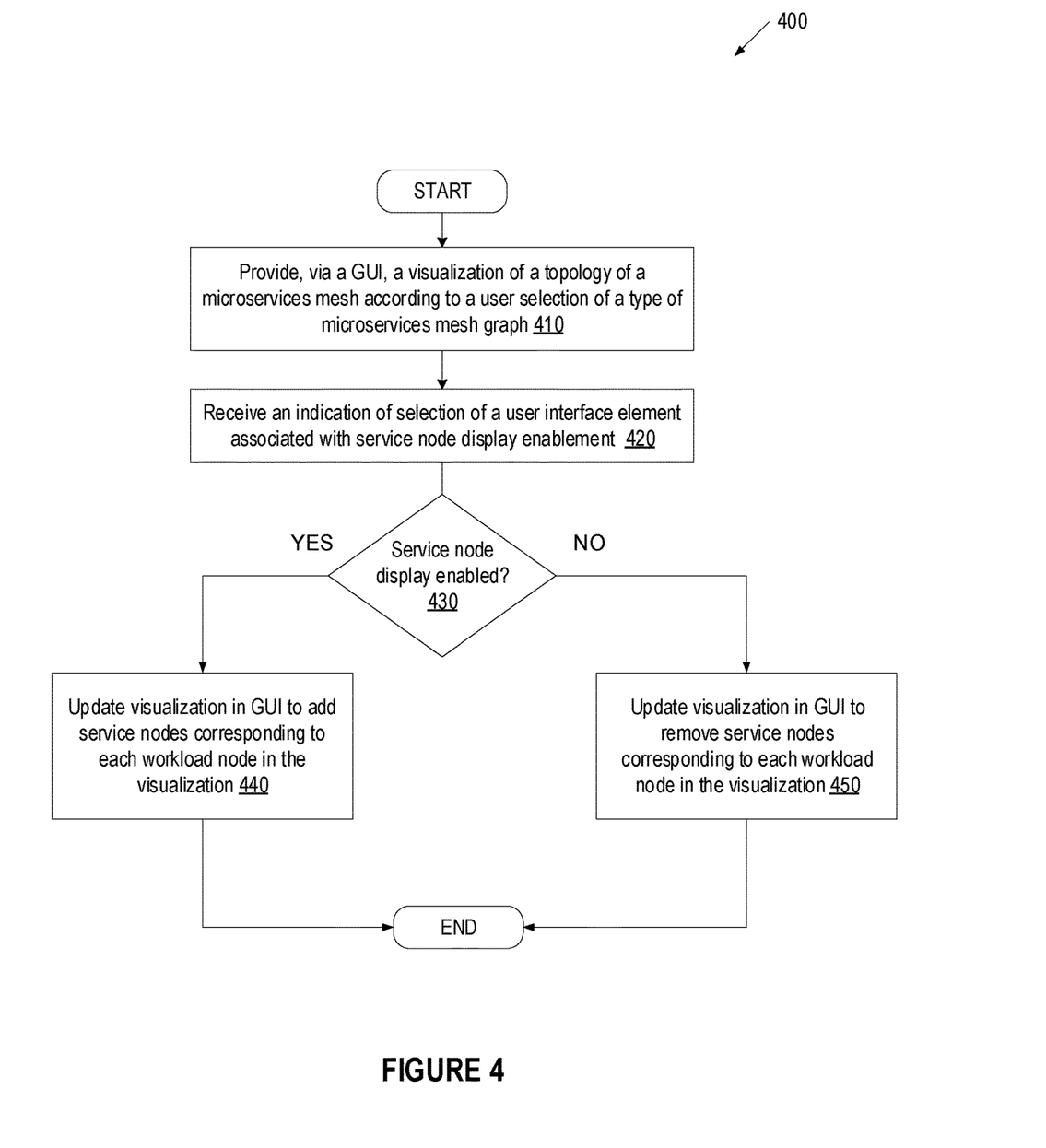
FIG. 4 depicts a flow diagram of an example method for dynamically injecting service nodes into a visualized microservices mesh topology, in accordance with one or more aspects of the disclosure.

FIGS. 3 and 4 depict flow diagrams for illustrative examples of methods 300 and 400 for dynamically visualizing microservices mesh topologies, in accordance with one or more aspects of the disclosure. Method 300 illustrates an example process flow for dynamically visualizing microservices mesh topologies, according to at least one implementation. Method 400 is an example process flow for dynamically injecting service nodes into a visualized microservices mesh topologies according to at least one implementation.

Methods 300 and 400 may be performed by processing devices that may comprise hardware (e.g., circuitry, dedicated logic, programmable logic, microcode, etc.), executable code (such as is run on a general purpose computer system or a dedicated machine), or a combination of both. Methods 300 and 400 and each of their individual functions, routines, subroutines, or operations may be performed by one or more processors of the computer device executing the method. In certain implementations, methods 300 and 400 may each be performed by a single processing thread. Alternatively, methods 300 and 400 may be performed by two or more processing threads, each thread executing one or more individual functions, routines, subroutines, or operations of the method. In an illustrative example, the processing threads implementing methods 300 and 400 may be synchronized (e.g., using semaphores, critical sections, and/or other thread synchronization mechanisms). Alternatively, the processes implementing methods 300 and 400 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or memory page media. In one implementation, methods 300 and 400 may be performed by computer system 100 as shown in FIG. 1.

Referring to FIG. 3, method 300 may be performed by processing devices of a server device or a client device and may begin at block 310. At block 310, a processing device may receive a first request for a first type of visualization of a microservices mesh including nodes. In one implementation, the nodes may include workload nodes, application nodes, and service nodes of a containerized computing services platform. At block 320, the processing device may obtain first information regarding the nodes of the microservices mesh corresponding to the first type of visualization. Then, at block 330, the processing device may, in response to the first request, provide in a GUI the first type of visualization of the microservices mesh using the first information.

Subsequently, at block 340, the processing device may receive a second request for a second type of visualization of the microservices mesh. At block 350, the processing device may obtain second information regarding the nodes of the microservices mesh corresponding to the second type of visualization, the second type of visualization different form the first type of visualization. Lastly, at block 360, the processing device may, in response to the second request, provide, via an update to the GUI, the second type of visualization of the microservices mesh using the second information. Responsive to completing the operations described herein above with reference to block 360, the method 300 may terminate.

Referring to FIG. 4, method 400 may be performed by processing devices of a server device or a client device and may begin at block 410. At block 410, a processing device may provide, via a GUI, a visualization of a topology of a microservices mesh according to a user selection of a type of microservices mesh graph. At block 420, the processing device may receive an indication of selection of a user interface element associated with service node display enablement.

Subsequently, at decision block 430, the processing device determines whether the selection of the user interface elements caused service node display to be enabled in the GUI. If service node display is enabled, then method 400 proceeds to block 440. At block 440, the processing device may update the visualization in the UGI to add service nodes corresponding to each workload node in the visualization. Referring back to decision block 430, if service node display is not enabled, then method 400 proceeds to block 450. At block 450, the processing device may update the visualization in the GUI to remove service nodes corresponding to each workload node in the visualization. Responsive to completing the operations described herein above with reference to either of blocks 440 or 450, the method 400 may terminate.

Figure 5:
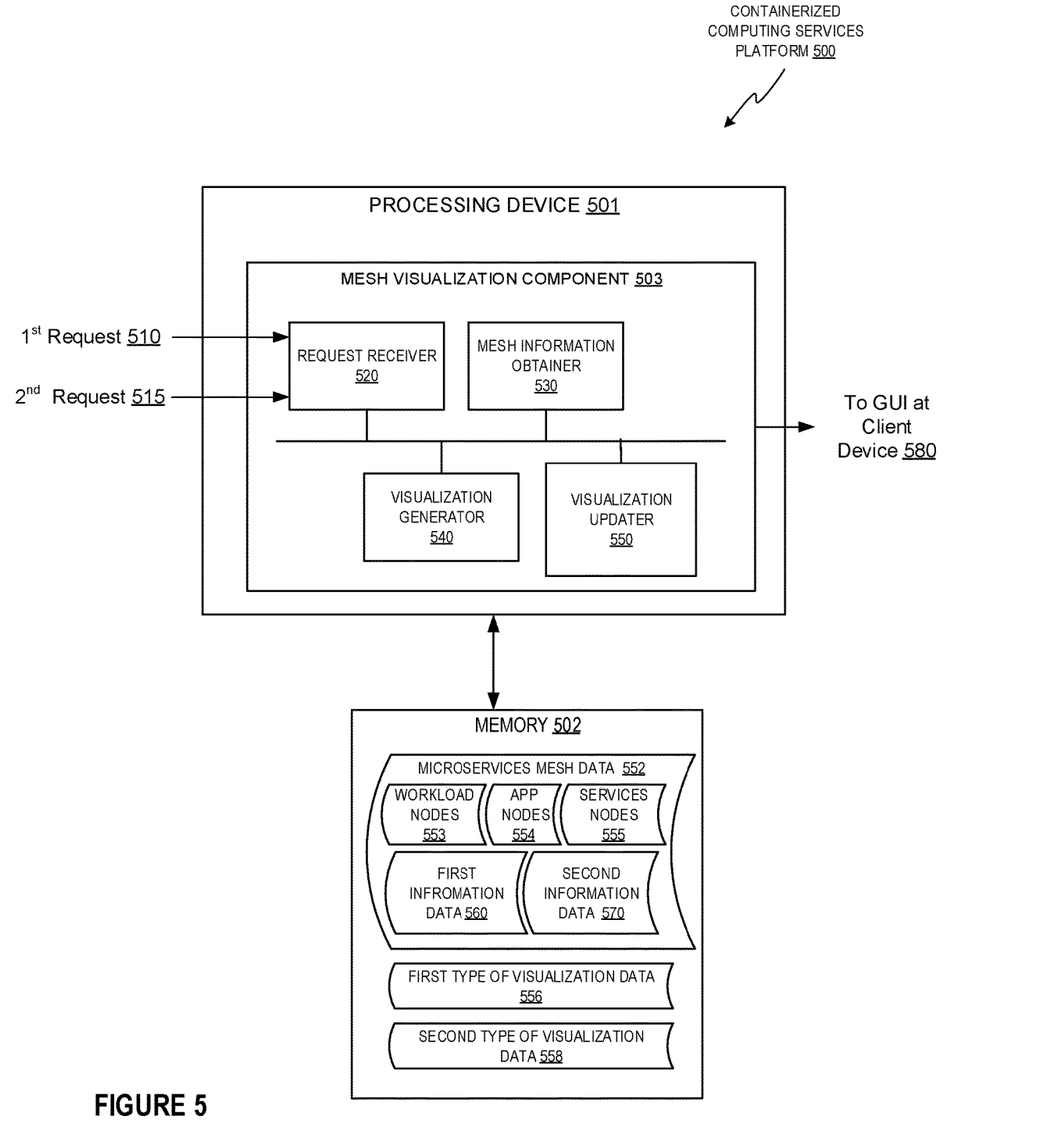
FIG. 5 depicts a block diagram of an example computer system in accordance with one or more aspects of the disclosure.

FIG. 5 depicts a block diagram of a containerized computing service platform 500 operating in accordance with one or more aspects of the disclosure. Containerized computing service platform 500 may be the same or similar to computer system 100 and may include one or more processing devices 501 and one or more memory devices 502. In the example shown, the processing device 501 of containerized computing service platform 500 may include a mesh visualization component 503.

Mesh visualization component 503 may enable the processing device 501 to execute a request receiver 520 to receive a first request 510 for a first type of visualization 556 of a microservices mesh 552 having nodes comprising workload nodes 553, application nodes 554, and service nodes 555 of a containerized computing services platform. Mesh visualization component 503 may further enable the processing device 501 to execute a mesh information obtainer 530 to obtain first information 560 regarding the nodes of the microservices mesh 552 corresponding to the first type of visualization 556. Mesh visualization component 503 may further enable the processing device 501 to execute a visualization generator 540 to, in response to the first request 510, provide, via a graphical user interface (GUI) 580, the first type of visualization 556 of the microservices mesh 552 using the first information 560.

The request receiver 520 may then receive a second request 515 for a second type of visualization 558 of the microservices mesh 552. The mesh information obtainer 530 may obtain second information 570 regarding the nodes of the microservices mesh 552 corresponding to the second type of visualization 558. In one implementation, the second type of visualization 558 is different form the first type of visualization 556. Mesh visualization component 503 may further enable the processing device 501 to execute a visualization updater 550 to, in response to the second request 515, update, while the microservices mesh 552 is operating, the GUI 580 to provide the second type of visualization 558 of the microservices mesh 552 using the second information 570.

Figure 6:
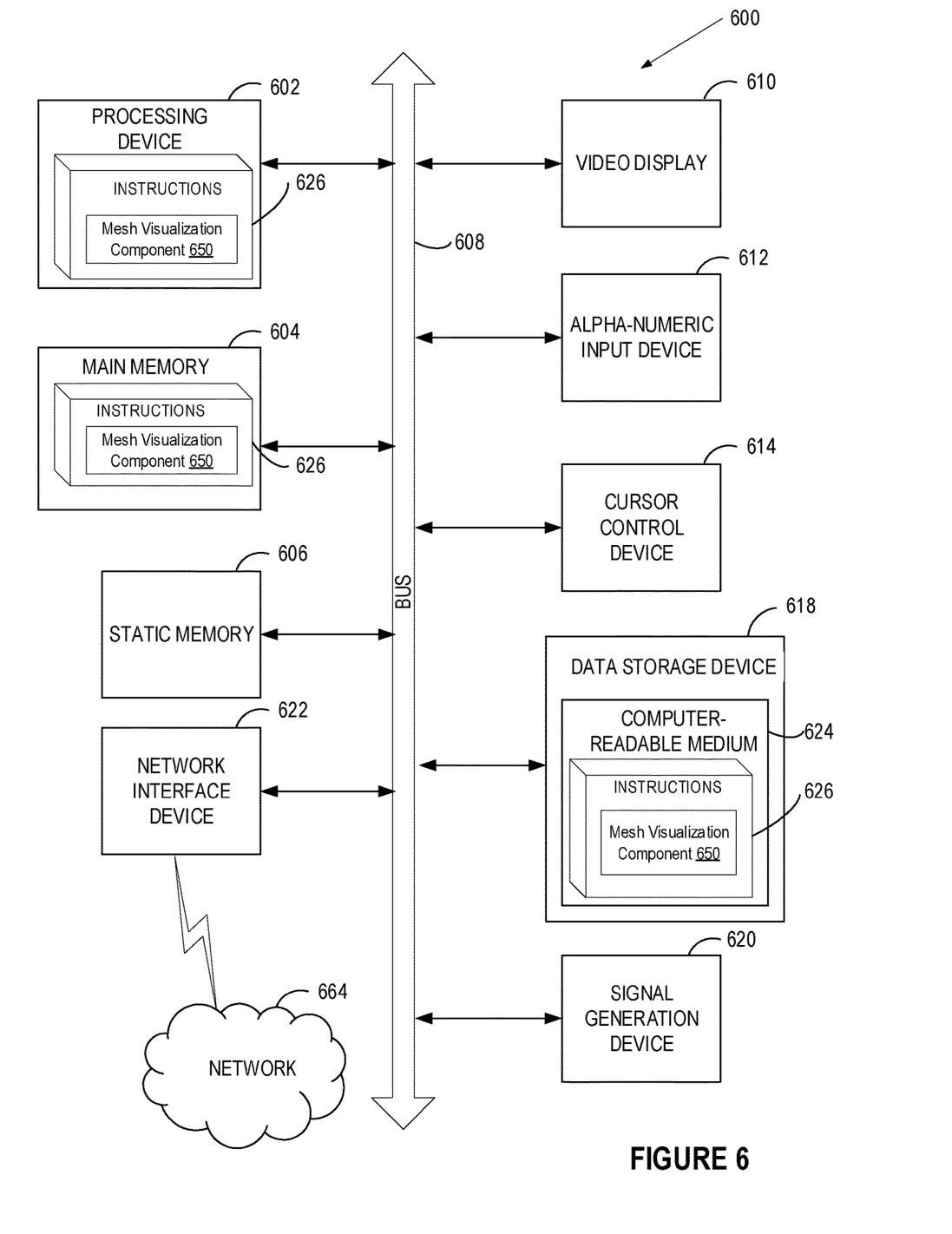
FIG. 6 depicts a block diagram of an illustrative computing device operating in accordance with the examples of the disclosure.

FIG. 6 depicts a block diagram of a computer system operating in accordance with one or more aspects of the disclosure. In various illustrative examples, computer system 600 may correspond to computer system 100 of FIG. 1. The computer system may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a computing device to translate these requests to the underlying physical computing hardware resources. This type of virtualization results in multiple VMs sharing physical resources.

In certain implementations, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 may include a processing device 602, a volatile memory 604 (e.g., random access memory (RAM)), a non-volatile memory 606 (e.g., read-only memory (ROM) or electrically-erasable programmable ROM (EEPROM)), and a data storage device 616, which may communicate with each other via a bus 608.

Processing device 602 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 may further include a network interface device 622. Computer system 600 also may include a video display unit 610 (e.g., an LCD), an alpha-numeric input device 612 (e.g., a keyboard), a cursor control device 614 (e.g., a mouse), and a signal generation device 620.

Data storage device 616 may include a non-transitory computer-readable storage medium 624 on which may store instructions 626 encoding any one or more of the methods or functions described herein, including instructions for implementing methods 300 or 400 and for mesh visualization component 650 (which may be the same as mesh visualization component 142 of FIG. 1) and the modules illustrated in FIGS. 1, 5, and 6.

Instructions 626 may also reside, completely or partially, within volatile memory 604 and/or within processing device 602 during execution thereof by computer system 600, hence, volatile memory 604 and processing device 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

Other computer system designs and configurations may also be suitable to implement the system and methods described herein.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "determining," "detecting," "verifying," "evicting," "selecting," "restricting," "receiving," "updating," "providing" or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 300 and/or each of its individual functions, routines, subroutines, or operations. Examples of the structure for a variety of these systems are set forth in the description above.

The above description is intended to be illustrative, and not restrictive. Although the disclosure has been described with references to specific illustrative examples and implementations, it will be recognized that the disclosure is not limited to the examples and implementations described. The scope of the disclosure should be determined with reference to the following claims, along with the full scope of equivalents to which the claims are entitled.

What is claimed is:

1. A method comprising:
   receiving, by a processing device, an information regarding a plurality of nodes of a microservice mesh, wherein the information specifies a plurality of connections between nodes of the microservice mesh, a plurality of workloads of the microservice mesh, and a plurality of services of the microservice mesh;

providing, in view of the information, a visualization of the microservice mesh via a graphical user interface (GUI), wherein the visualization includes the plurality of workloads of the microservice mesh; and updating the visualization to depict respective services that correspond to each workload of the plurality of workloads of the microservice mesh.

2. The method of claim 1, wherein the visualization of the microservice mesh comprises a workload graph depicting workload nodes of the microservice mesh.

3. The method of claim 1, wherein the visualization of the microservice mesh comprises a versioned app graph depicting versions of application nodes of the microservice mesh.

4. The method of claim 1, wherein the visualization of the microservice mesh comprises an app graph depicting an aggregated version of each application node of the microservice mesh.

5. The method of claim 1, wherein the visualization of the microservice mesh comprises a services graph depicting service nodes of the microservice mesh.

6. The method of claim 1, further comprising:
receiving a request to inject service nodes into the visualization; and
updating the visualization to depict respective service nodes that correspond to each workload node.

7. The method of claim 1, further comprising:
updating the visualization to depict performance data corresponding to the connections as labels for each edge connecting two nodes of the plurality of nodes.

8. The method of claim 7, wherein the performance data comprises at least one of request rate, response time, or percentage distribution of requests.

9. The method of claim 1, wherein the nodes comprise workload nodes, application nodes, and service nodes of a containerized computing services platform.

10. A system comprising:
a memory; and
a processing device coupled to the memory, the processing device to:
receive an information regarding a plurality of nodes of a microservice mesh, wherein the information specifies a plurality of connections between nodes of the microservice mesh, a plurality of workloads of the microservice mesh, and a plurality of services of the microservice mesh;
provide, in view of the information, a visualization of the microservice mesh via a graphical user interface (GUI), wherein the visualization includes the plurality of workloads of the microservice mesh; and
update the visualization to depict respective services that correspond to each workload of the plurality of workloads of the microservice mesh.

11. The system of claim 10, wherein the visualization of the microservice mesh comprises a workload graph depicting workload nodes of the microservice mesh.

12. The system of claim 10, wherein the visualization of the microservice mesh comprises a versioned app graph depicting versions of application nodes of the microservice mesh.

13. The system of claim 10, wherein the visualization of the microservice mesh comprises an app graph depicting an aggregated version of each application node of the microservice mesh.

14. The system of claim 10, wherein the visualization of the microservice mesh comprises a services graph depicting service nodes of the microservice mesh.

15. The system of claim 10, wherein the processing device is further to:
update the visualization to depict respective service nodes that correspond to each workload node.

16. A non-transitory computer-readable storage medium storing executable instructions that, when executed by a processing device, cause the processing device to:
receive an information regarding a plurality of nodes of a microservice mesh, wherein the information specifies a plurality of connections between nodes of the microservice mesh, a plurality of workloads of the microservice mesh, and a plurality of services of the microservice mesh;
provide, in view of the information, a visualization of the microservice mesh via a graphical user interface (GUI), wherein the visualization includes the plurality of workloads of the microservice mesh; and
update the visualization to depict respective services that correspond to each workload of the plurality of workloads of the microservice mesh.

17. The non-transitory computer-readable storage medium of claim 16, wherein the visualization of the microservice mesh comprises a workload graph depicting workload nodes of the microservice mesh.

18. The non-transitory computer-readable storage medium of claim 16, wherein the visualization of the microservice mesh comprises a versioned app graph depicting versions of application nodes of the microservice mesh.

19. The non-transitory computer-readable storage medium of claim 16, wherein the visualization of the microservice mesh comprises an app graph depicting an aggregated version of each application node of the microservice mesh.

20. The non-transitory computer-readable storage medium of claim 16, wherein the visualization of the microservice mesh comprises a services graph depicting service nodes of the microservice mesh.

* * * * *